United States Patent
Wang et al.

(10) Patent No.: US 11,416,661 B2
(45) Date of Patent: Aug. 16, 2022

(54) AUTOMATIC DERIVATION OF INTEGRATED CIRCUIT CELL MAPPING RULES IN AN ENGINEERING CHANGE ORDER FLOW

(71) Applicant: Synopsys, Inc., Mountain View, CA (US)

(72) Inventors: Kai-Ping Wang, Fremont, CA (US); Wencai Zheng, Shanghai (CN); Deepak Sherlekar, Cupertino, CA (US); Xiaolin Yuan, Shanghai (CN)

(73) Assignee: Synopsys, Inc., Mountain View, CA (US)

( * ) Notice: Subject to any disclaimer, the term of this patent is extended or adjusted under 35 U.S.C. 154(b) by 5 days.

(21) Appl. No.: 16/988,275

(22) Filed: Aug. 7, 2020

(65) Prior Publication Data

US 2021/0042459 A1 Feb. 11, 2021

(30) Foreign Application Priority Data

Aug. 7, 2019 (CN) .......................... 201910725372.3

(51) Int. Cl.
  *G06F 30/327* (2020.01)
  *G03F 1/42* (2012.01)
  *G06F 111/04* (2020.01)
(52) U.S. Cl.
  CPC .............. *G06F 30/327* (2020.01); *G03F 1/42* (2013.01); *G06F 2111/04* (2020.01)

(58) Field of Classification Search
  CPC .... G03F 1/42; G03F 2111/04; G03F 2117/06; G03F 30/327; G03F 30/347
  See application file for complete search history.

(56) References Cited

U.S. PATENT DOCUMENTS

| | | | | |
|---|---|---|---|---|
| 5,131,058 A * | 7/1992 | Ting | ....................... | G06K 15/00 358/515 |
| 6,112,213 A * | 8/2000 | Koyama | ................ | G06F 40/166 715/212 |
| 6,266,662 B1 * | 7/2001 | Ozbutun | .................. | G06F 16/30 707/700 |
| 6,453,454 B1 * | 9/2002 | Lee | .......................... | G06F 30/30 716/102 |
| 6,651,239 B1 * | 11/2003 | Nikitin | ..................... | G06F 30/30 716/104 |
| 7,051,253 B2 * | 5/2006 | Rooney | ................... | G11C 29/10 714/718 |
| 7,054,488 B2 * | 5/2006 | White | .................... | G06F 40/174 382/190 |
| 7,111,269 B2 * | 9/2006 | Satapathy | ............... | G06F 30/39 716/102 |

(Continued)

*Primary Examiner* — Helen Rossoshek
(74) *Attorney, Agent, or Firm* — Sterne, Kessler, Goldstein & Fox P.L.L.C.

(57) ABSTRACT

A method includes generating a first bitmap for a cell. The first bitmap is indicative of mapping constraints of the cell. The method also includes generating a second bitmap for a PSC filler cell. The second bitmap is indicative of the mapping constraints of the PSC filler cell. The method also includes a bitwise logical operation between a portion of the first bitmap and a respective portion of the second bitmap and determining a compatibility between the cell and the PSC filler cell based on at least a result of the bitwise logical operation.

19 Claims, 8 Drawing Sheets

(56) References Cited

U.S. PATENT DOCUMENTS

| | | | | |
|---|---|---|---|---|
| 7,215,342 B2* | 5/2007 | Zhu | G06T 15/503 | 345/592 |
| 7,567,706 B2* | 7/2009 | Gotz | G06F 16/957 | 382/166 |
| 7,581,201 B2* | 8/2009 | Kazda | G06F 30/39 | 716/113 |
| 7,634,743 B1* | 12/2009 | Ginetti | G06F 30/327 | 716/103 |
| 7,644,061 B1* | 1/2010 | Fallis | H04L 12/66 | 707/999.001 |
| 7,644,382 B2* | 1/2010 | Budumuru | G06F 30/3323 | 716/106 |
| 7,830,171 B1* | 11/2010 | New | H03K 19/17796 | 326/40 |
| 8,112,730 B2* | 2/2012 | Aleksanyan | G01R 31/318357 | 716/111 |
| 8,166,432 B2* | 4/2012 | Kosugi | G06F 30/367 | 716/108 |
| 8,255,861 B2* | 8/2012 | Bhinge | G06F 11/263 | 716/136 |
| 8,350,868 B2* | 1/2013 | Chang | G06T 11/60 | 345/592 |
| 8,688,655 B2* | 4/2014 | Fusco | G06F 16/2237 | 707/693 |
| 8,713,501 B1* | 4/2014 | Le | G06F 30/30 | 716/113 |
| 9,426,686 B2* | 8/2016 | Yi | H04W 24/10 | |
| 9,442,835 B1* | 9/2016 | Watts | G06F 12/0669 | |
| 9,483,240 B1* | 11/2016 | Boyar | G06F 8/433 | |
| 9,619,923 B2* | 4/2017 | Zimmerman | G06T 15/50 | |
| 9,639,777 B1* | 5/2017 | Moloney | G06K 9/4642 | |
| 9,740,714 B2* | 8/2017 | Attaluri | G06F 16/215 | |
| 9,946,748 B2* | 4/2018 | Barber | G06F 16/24544 | |
| 9,977,623 B2* | 5/2018 | Jean | G06F 12/0246 | |
| 10,936,899 B2* | 3/2021 | Moloney | G06K 9/3241 | |
| 2015/0234977 A1* | 8/2015 | Lee | G06F 30/398 | 716/52 |
| 2015/0371408 A1* | 12/2015 | Schultz | B60K 35/00 | 345/589 |
| 2017/0185405 A1* | 6/2017 | Jin | G06F 9/3838 | |
| 2017/0201898 A1* | 7/2017 | Park | H04L 5/0048 | |
| 2017/0228407 A1* | 8/2017 | Mano | G06F 16/221 | |
| 2018/0025782 A1* | 1/2018 | Bandic | G11C 11/5628 | 365/185.03 |
| 2018/0357332 A1* | 12/2018 | Fan | G06F 16/90344 | |
| 2019/0317940 A1* | 10/2019 | Bauer | G06F 17/11 | |
| 2020/0168595 A1* | 5/2020 | Chang | H01L 27/0688 | |

* cited by examiner

AUTOMATIC DERIVATION OF INTEGRATED CIRCUIT CELL MAPPING RULES IN AN ENGINEERING CHANGE ORDER FLOW

CROSS-REFERENCE TO RELATED APPLICATIONS

The present application claims the benefit of Chinese Patent Application No. 201910725372.3, filed on Aug. 7, 2019, which is incorporated herein by reference in its entirety for all purposes.

TECHNICAL FIELD

The present disclosure relates to automatic deviation of integrated circuit cell mapping rules in an engineering change order flow.

BACKGROUND

In a freeze silicon (post tape-out) engineering change order (ECO) flow, new ECO cells are mapped to existing spare cells of the same reference or to existing programmable spare cells (PSC). PSCs are also known as ECO filler cells, and in this disclosure, they are referred to simply as filler cells or PSC fillers. Spare cells and PSC library cells are special cells in logic cell libraries. In older nodes, mapping ECO cells to PSC cells involves simple compatibility checks. The main focus is layout compatibility on layers below the metal layers. In advanced nodes (e.g., 7 nm), in addition to compatibility on layers below metal layers, many other cell placement rules and compatibility with chip level features on routing rules layers to be satisfied in ECO-PSC cell mapping.

For every pair of ECO and PSC cells which are compatible on layers below metal layers, the ECO-PSC mapping also satisfies constraints such as conflicts with power and ground (PG) pre-routes, routing track coloring alignment for metal pins, pin to PG spacing, and via spacing. The largest number of constraints stem from routing track coloring alignment for metal pins and avoiding conflict with PG pre-routes. The ECO-PSC mapping is further complicated by the large variety of cells which have identical metal footprints but differ in lower layers which are frozen during the ECO flow.

SUMMARY

In one aspect, a method includes generating a first bitmap for a cell. The first bitmap is indicative of mapping constraints of the cell. The method also includes generating a second bitmap for a PSC filler cell. The second bitmap is indicative of the mapping constraints of the PSC filler cell. The method also includes a bitwise logical operation between a portion of the first bitmap and a respective portion of the second bitmap and determining, in response to a request of a cell-cell filler mapping during an engineering change order flow, a compatibility between the cell and the filler cell based on at least a result of the bitwise logical operation.

In one aspect, a system includes a memory storing instructions and a processor, coupled with the memory and to execute the instructions. The instructions when executed cause the processor to generate a first bitmap for a cell. The first bitmap is indicative of mapping constraints of the cell. The processor also generates a second bitmap for a filler cell. The second bitmap is indicative of the mapping constraints of the filler cell. The processor also perform a bitwise logical operation between a portion of the first bitmap and a respective portion of the second bitmap and determine, in response to a request of a cell-cell filler mapping during an engineering change order flow, a compatibility between the cell and the filler cell based on at least a result of the bitwise logical operation.

In one aspect, a non-transitory computer readable medium comprising stored instructions, which when executed by a processor, cause the processor to generating a first bitmap for a cell. The first bitmap is indicative of mapping constraints of the cell. The processor also generates a second bitmap for a filler cell. The second bitmap is indicative of the mapping constraints of the filler cell. The processor also performs a bitwise logical operation between a portion of the first bitmap and a respective portion of the second bitmap and determines, in response to a request of a cell-cell filler mapping during an engineering change order flow, a compatibility between the cell and the filler cell based on at least a result of the bitwise logical operation.

In one aspect, a method includes generating a first bitmap for a cell, the first bitmap being indicative of mapping constraints of the cell, generating a second bitmap, the second bitmap being indicative of power and ground (PG) pre-routes on tracks above the cell, performing a bitwise logical operation between the first bitmap and the second bitmap; and determining a compatibility between the cell with the PG pre-routes based on at least a result of the bitwise logical operation.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
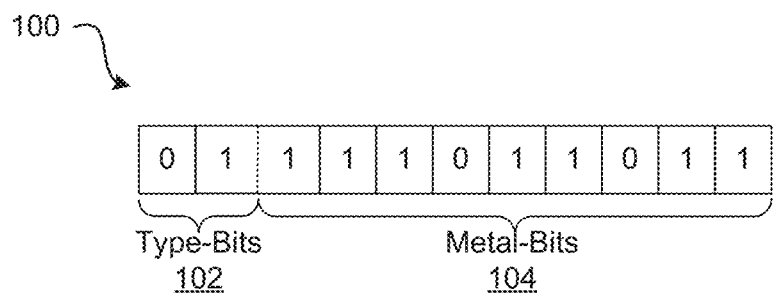
FIG. 1 depicts an example of a bitmap including type bits and metal bits, in accordance with an embodiment of the present disclosure.

Aspects of the present disclosure relate to automatic derivation of integrated circuit cell mapping rules in an engineering change order (ECO) flow.

A circuit may involve multiple basic layers, multiple contacts, and multiple metal layers. A freeze silicon engineering change order flow is implemented when a design is modified after taping out. The number of ECO changes can be small. However, with the shortening time to market pressure, some designers choose to tape out the design with base layer first and leave some timing issues to be fixed using the freeze silicon flow. In these cases, the number of ECO cell changes can be high.

The conventional approach is to setup mapping rules, one rule per constraint, for all the constraints that are to be considered. In the conventional approach, each constraint is expressed as a separate rule, requiring a rule checker to be run for every possible combination of ECO and programmable spare cells (PSC) cells. The turn-around time to develop the rule checker and to manually setup all mapping rules is high, and may take weeks. The run time for checking all mapping rules is also high. Therefore, an easy flow setup and fast runtime for the freeze silicon flow are desired.

Accordingly, other approaches are desired to reduce the effort to define the mapping rules and to improve the efficiency of constraint checking during ECO-PSC cell mapping.

Described herein are approaches to represent mapping rules and to auto derive such rules for addressing many routing and placement requirements, performing compatibility checks for ECO cell mapping, and propagating mapping rules to new PSC cells formed when merging or splitting PSC cells.

In order to accelerate the checking of the rules, a model (abstract model) of each PSC cell (PSC filler cell) and ECO cell (PSC ECO cell) is extracted as a bitmap array of zeros and ones to represent the properties of information used in the placement/routing constraints checks (i.e., metal features and metal tracks within the cell). Examples of metal features include, but are not limited to, metal track alignment, mask color, and tracks reserved/blocked for pre-routes such as power and ground (PG) connections. The model may be used to obtain faster and easier checking of compatibility rules when mapping ECO cells onto available PSC resources during post tape-out ECO flow. The flow setup time can be reduced from few weeks to few minutes.

In one embodiment, variable length bitmaps are used to represent mapping rules to address placement routing rules. There is one bitmap for each PSC and each ECO library cell. Instance-specific bitmaps for PSC cells placed over pre-routed PG net connections are used. The bitmap for a PSC or an ECO library cell is auto derived based on associated metal and pin metal coloring constraints information during the library preparation phase. The instance-specific bitmap is auto derived based on the PSC cell location information (e.g., track coloring, PG overlapping).

Compatibility check during the mapping of ECO and PSC cells can be done with a bitwise logical operation (e.g., AND operation) between two bitmaps. If a PSC cell has instance-specific bitmap, then checking is done between the bitmap of the ECO cell and the instance-specific bitmap of the PSC instance. If a large PSC cell is split into multiple smaller ones or if multiple contiguous PSC cells are merged into a big PSC cell, the mapping rules can be easily propagated or split by simply copying the corresponding bitmaps from the source PSC cell/cells to the final PSC cells.

FIG. 1 depicts an example of a bitmap 100 in accordance with an embodiment of the present disclosure. The bitmap 100 is a packed array of bits. The bitmap 100 includes two parts: a first field 102 and a second field 104. The first field 102 indicates type-bits and the second field 104 indicates metal-bits.

In one embodiment, the type-bits field indicates the track alignment constraint of a target metal layer, including a track location and a mask pattern. Typically, the offset and mask patterns of all tracks on a chip follow a regular and repetitive pattern. Thus, the focus is on the offset and mask pattern of the first (lowest) track on the cell. The length of the first field 102 is not fixed for different designs. In one embodiments, the length of the first field 102 is two. When using a length of two, all potential values of the first field 102 may be "00", "01", "10" and "11".

In one embodiment, the metal-bits field indicates the PG shape constraint of a target metal layer. For example, the metal bits indicate the presence or absence of metal features on a corresponding metal track. The length of the metal-bits field is determined by the number of tracks of the target metal layer in the cell. In one embodiment, the length of the metal-bits field may exceed the number of tracks as described further below.

For a PSC ECO cell, each bit indicates whether it has shape of the target metal layer or not on the corresponding track location. Binary bit "1" indicates the presence of the metal shape and binary bit "0" indicates the absence of the metal shape.

For a PSC filler cell, each bit indicates whether there is a pre-route (PG) shape of the target metal layer or not on the corresponding track location. A binary bit "1" in the second field indicates that there is no PG shape. That is, a metal shape of ECO cell on that track is permitted. A binary "0" indicates that there is a PG shape on the track. That is, metal shape of the ECO cell is not allowed on the track.

Figure 2:
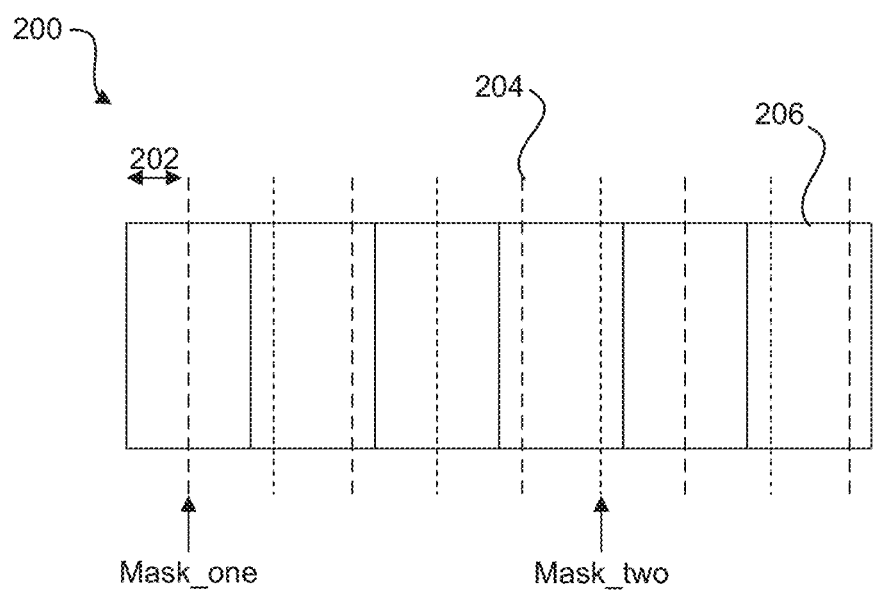
FIG. 2 depicts an example of a cell geometry with metal tracks for a base programmable spare cells (PSC) cell, in accordance with an embodiment of the present disclosure.

FIG. 2 depicts an example of cell geometry 200 with metal tracks for a base PSC cell, in accordance with an embodiment of the present disclosure. The width of the cell is one unit width. In one example, the cell may include six sites 206. The mask pattern of each track is either mask_one or mask_two. The offset of the first track on the cell can have two values: ½ of the site width or ⅙ of the site width. There are nine tracks 204 on the unit cell.

In one embodiment, two bits are used to represent the type-bits field. The first bit indicates a track offset value 202 and the second bit indicates the mask pattern. In one example, binary 0 may be used to indicate an offset of ½ and binary 1 may be used to indicate an offset of ⅙. In addition, binary 0 may be used to indicate mask_one and binary 1 may be used to indicate mask_two. Thus, a value of "01" in the first field 102 indicates that the offset is ½ and the mask pattern is mask_two. Nine bits are used to represent the metal-bits field.

Figure 3:
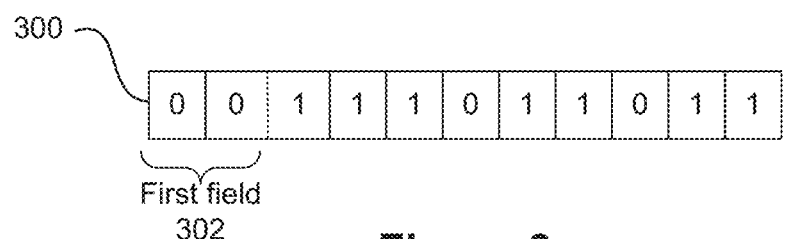
FIG. 3 depicts an example of a bitmap for the base PSC cell, in accordance with an embodiment of the present disclosure.

FIG. 3 depicts an example of a bitmap 300 for a base PSC cell, in accordance with an embodiment of the present disclosure. The first field 302 (i.e., type-bits field) for the cell has a value of 00. Thus, the first field 302 indicates that the offset of the first track on the cell is ½ and the mask pattern is mask_one.

Figure 4:
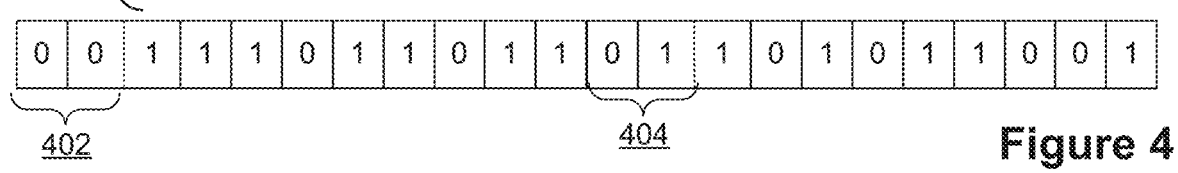
FIG. 4 depicts an example of a bitmap for another base PSC cell, in accordance with an embodiment of the present disclosure.

FIG. 4 depicts an example of a bitmap 400 for a base PSC cell, in accordance with an embodiment of the present disclosure. The base PSC cell has a width equals to two unit width. The type-bits field of cells of two unit width are the combination of the type-bits field of the corresponding one unit width cells. In one example, the type-bits value of the two unit width cell is "00,01" (i.e., combination of first field 402 and first field 404). The type-bits value in a bitmap of a two unit width base cell can be "00,01", "11, 10", "01, 00" and "10, 11". The first field 402 of the bitmap 400 is compatible with the bitmap 300 of the one unit width cell of FIG. 3.

The bitmap for PSC fillers can be derived based on the track information and PG shape information of the target metal layer. Track and PG shape query engine can be built before the bitmap for PSC fillers is derived. For a given PSC filler, the tracks and PG shapes of the target metal layer that overlap with the PSC filler are queried. Then, the bitmap representation rule is followed to derive the bitmap with the following information: minimum PSC unit width, track number on this filler, track space (step), the offset of the first track, the mask pattern of the first track, geometry information of target PG metal shapes on the PSC filler.

Figure 5:
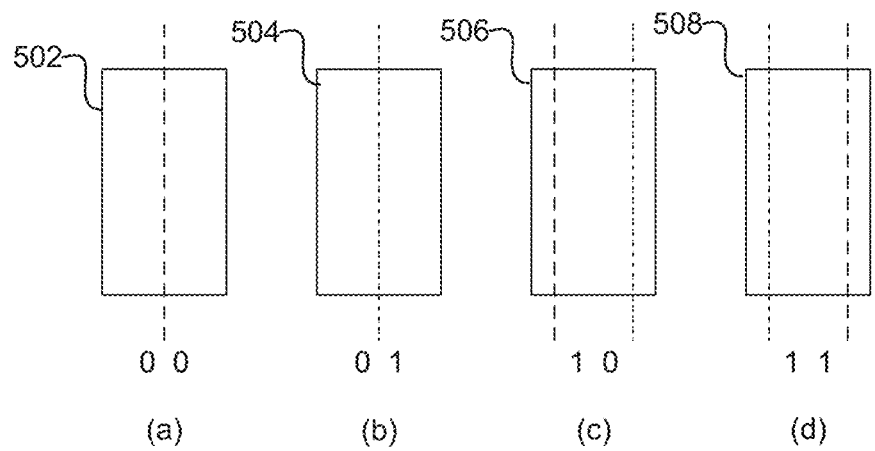
FIG. 5 depicts possible offset/color combinations of a first metal track in a PSC cell and the auto derivation of the associated type-bits, in accordance with an embodiment of the present disclosure.

FIG. 5 depicts four possible offset/color combinations of the first metal track in a PSC cell and the auto derivation of the corresponding type-bits, in accordance with an embodiment of the present disclosure. The first bit indicates the track offset value and the second bit indicates the mask pattern as discussed previously herein. The type bits of a first track 502 are "00". The type bits of a second track 504 are "01". The type bits of a third track 506 are "10". The type bits of a fourth track 508 are "11".

Figure 6:
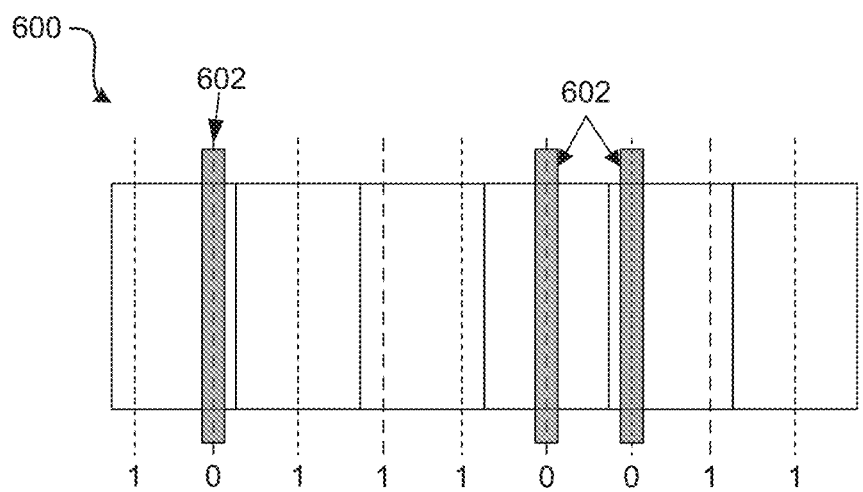
FIG. 6 depicts auto derivation of the metal-bits value of a PSC cell based on the presence of a pre-route such as power and ground (PG) for each metal track in the PSC cell, in accordance with an embodiment of the present disclosure.

FIG. 6 depicts auto derivation of the metal-bits value of a PSC filler cell 600 based on the presence of a pre-route such as PG for each metal track in the cell, in accordance with an embodiment of the present disclosure. The length of the metal-bits field is the track number on the filler cell. Each bit value can be derived based on PG metal shapes on the filler cell. If there is PG metal shape on the $i^{th}$ track, the $i^{th}$ bit value is 0. Otherwise, the bit value is 1. Thus, a binary 1 means no PG overlapping and a binary 0 means PG overlapping. For example, PG shapes 602 are present on the second, sixth, and seventh track of the PSC filler cell 600. Thus, the metal-bits field is "101110011".

The PSC ECO cells have metal shapes of the target layer and the bitmap can be derived based on the information of metal shapes. The PSC ECO cells with the same reference library cell can have the same bitmap. For a given library cell of PSC ECO cells, target metal shapes are queried to get the location and mask information of the shapes. Then, the bitmap representation rule is implemented to derive the bitmap with the following information: width of the library cell, minimum PSC unit width, track space (step), geometry information of each metal shape, and mask information of each metal shape.

There are two steps to derive the type-bits value for PSC ECO cells. The first step is to calculate the offset and mask pattern of the first track based on the first metal shape and the track space as shown in FIG. 7 and the second step is to derive the type-bits value based on the offset and mask pattern of the first track.

Figure 7:
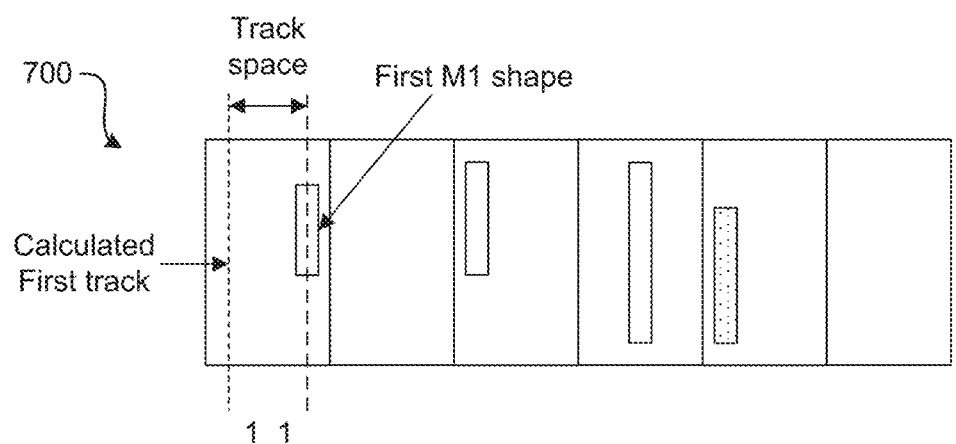
FIG. 7 depicts auto deriving of the type bits value for PSC ECO cells, in accordance with an embodiment of the present disclosure.

FIG. 7 depicts auto deriving type bits value for PSC ECO cells by calculating the offset and mask pattern of the first track based on the first metal shape and the track space, in accordance with an embodiment of the present disclosure. The derivation is similar as of the PSC filler cell as shown in FIG. 5. For a PSC ECO cell 700, the track offset value is ⅙, thus a binary 1 is assigned to the first bit of the type bits field (first field of the bitmap). Further, the first metal shape is mask_2, thus the second bit of the type bits field is 1.

Derivation of the second field (i.e., metal-bits) value for PSC ECO library cells may include three steps. The first step is to determine the length of the field. The length of the second field is determined based on the cell width and track space. The second step is to calculate all track locations within the cell based on the metal shapes and the track space. The third step is to derive the bit value for each track location. If it has a metal shape on the $i^{th}$ track location, the $i^{th}$ bit value is 1, otherwise the bit value is 0. Binary 1 means the track has metal. Binary 0 means the track does not have metal.

In one embodiment, a bit may be associated with every track that goes over the site. In other embodiments, two or more bits may be used for each track to indicate partial routes on a section of the routing track. For example, three bits may be used. A pre-route may be on the entire track, on the top of the PSC cell or PSC filler, on the bottom of the PSC cell or PSC filler, or in the middle of the PSC cell or PSC filler.

In one embodiment, three bits are used for each track when the pre-routes can be on the top, bottom, or the middle. In one embodiment, two bits per track are used when the pre-routes are only on top or bottom of the PSC cell or PSC filler. Thus, the length of the second field may exceed the number of tracks and is dependent on the site type.

Figure 8:
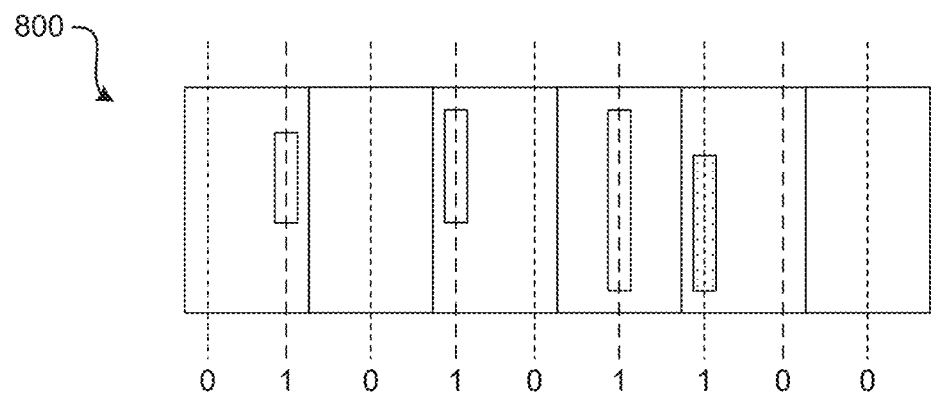
FIG. 8 depicts auto deriving of the metal bits value for PSC ECO cells based on usage of the corresponding metal track in a cell layout, in accordance with an embodiment of the present disclosure.

FIG. 8 depicts auto deriving metal bits value for PSC ECO cells based on usage of the corresponding metal track in the cell layout, in accordance with an embodiment of the present disclosure. For cell layout 800, a metal is present on the second, fourth, sixth, and seventh tack. Thus, the second field is "010101100".

The type-bits value in the bitmaps of the PSC ECO cell and the PSC filler meet the track alignment constraint of the target metal layer when they are the same (type-match, type compatible). To meet the PG metal constraint, the metal-bits value in the bitmaps of the PSC ECO cell and the PSC filler are compatible (metal-compatible) as discussed further below.

For track alignment and mask pattern check, the type-bits values of the PSC ECO cell and the PSC Filler cell are compared. It is type-match if the type-bits values are the same, and it means the constraints are met. If the type-bits of the two bitmaps do not match then there is a type-conflict and the constraints are not met.

Figure 9A:
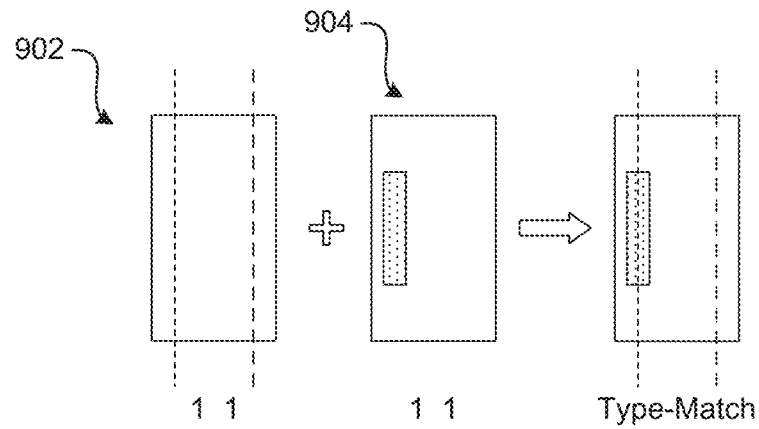
FIG. 9A depicts a type match with track alignment and mask pattern check, in accordance with an embodiment of the present disclosure.

The constraints include that the offset of the first track is the same. Since the track has regular space, so after mapping, all metal shapes of the target layer on the ECO cell can align with the tracks on it, as shown in FIG. 9A. FIG. 9A depicts a type match with track alignment and mask pattern check, in accordance with an embodiment of the present disclosure. A first track 902 of ECO cell and a first track 904 of the PSC filler cell have the same type bits value. Thus, there is a type-match.

Figure 9B:
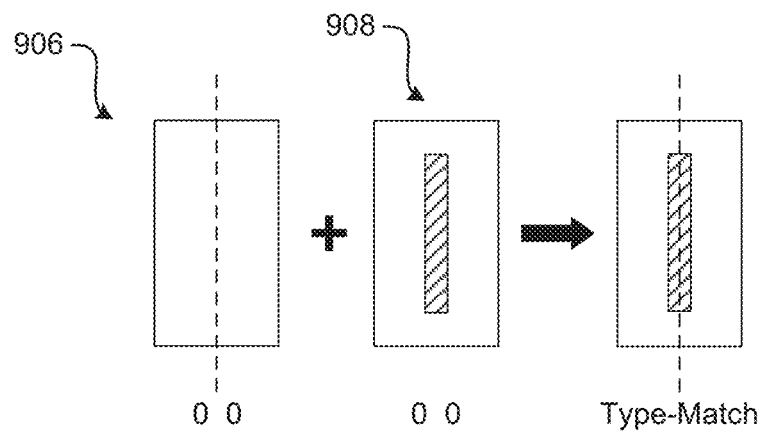
FIG. 9B depicts a type match example, in accordance with an embodiment of the present disclosure.

FIG. 9B depicts another type match example, in accordance with an embodiment of the present disclosure. The constraints also include that the mask pattern of the first track is the same in both cells. Since the track has regular mask patterns, so after mapping, all target metal shapes of the ECO cell can be on the track with the appropriate mask as shown in FIG. 9B. For example, ECO cell 906 and PSC filler cell 908 have the same mask pattern on the first track and the same offset. Thus, there is a type-match.

In one embodiment, a conflict check for PG metal shapes is performed to check whether metal shapes of the ECO cell conflict (overlap) with the existing PG metal shapes. The constraint is met if the ECO cell has no metal on the corresponding track location (i.e., bit value of 0) when there is a PG shape on the track (i.e., bit value of 0). When there is no PG shape on the track (bit value: 1), both the following cases can meet the constraint: the ECO cell has metal on the corresponding track location (bit value: 1) or the ECO cell has no metal on the corresponding track location (bit value: 0). A logical operation may be performed on the bitmaps to check whether the metal-bits values are compatible. In one example, a Boolean AND operation is performed between the second field of the bitmap associated with the ECO cell and the second field of the bitmap of the filler cell.

Figure 10A:
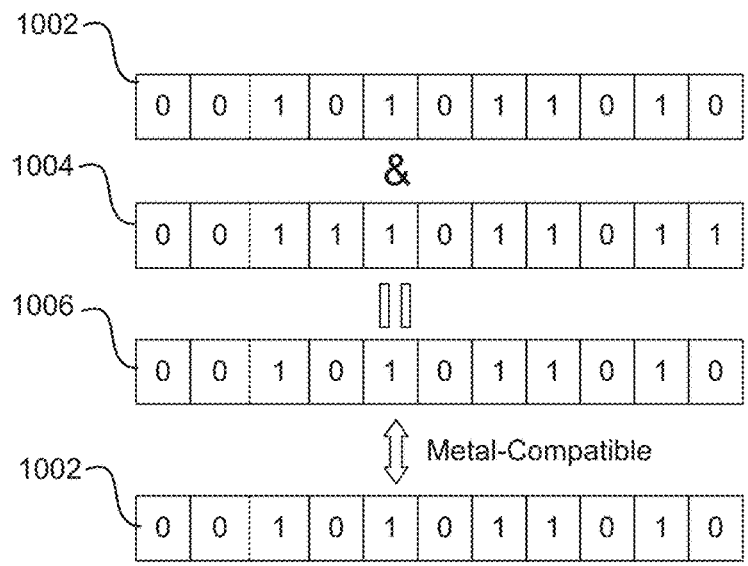
FIG. 10A depicts a metal compatible condition, in accordance with an embodiment of the present disclosure.

FIG. 10A depicts a metal compatible condition, in accordance with an embodiment of the present disclosure. Given an ECO cell with bitmap P and a PSC filler with bitmap Q, it is Metal-Compatible if P & Q==P. The bitmap 1002 of ECO cell is equal to 00101011010. The bitmap 1004 of the filler cell is equal to 00111011011. A Boolean AND operation is performed between bitmap 1002 and bitmap 1004. The result 1006 of the Boolean operation is 00101011010. Since the result of the Boolean operation is equal to the bitmap 1002, then it is metal compatible.

Figure 10B:
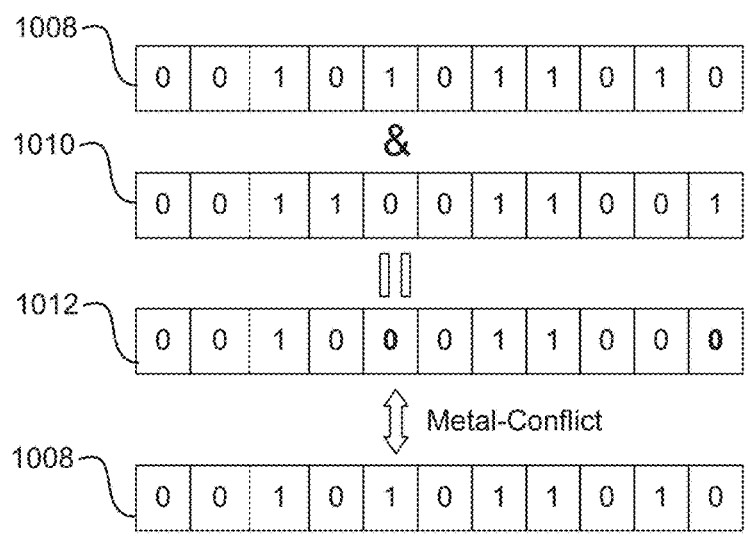
FIG. 10B depicts a metal conflict condition, in accordance with an embodiment of the present disclosure.

FIG. 10B depicts a metal conflict condition, in accordance with an embodiment of the present disclosure. Bitmap 1008 of ECO cell is equal to 00101011010. A bitmap 1010 of the filler cell is equal to 00110011001. A Boolean AND operation is performed between bitmap 1008 and 1010. The result 1012 of the Boolean operation is 00100011000. Since the result of the Boolean operation is not equal to the bitmap 1008, then there is a conflict.

In one embodiment, the approaches described herein can make it easy to merge and split PSC fillers with consideration of the mapping constrains using the bitmap representation described herein. When merging or splitting PSC fillers, the bitmap of the new merged or split fillers is easily obtained by simple operations without deriving the bitmap again for the new fillers.

Figure 11:
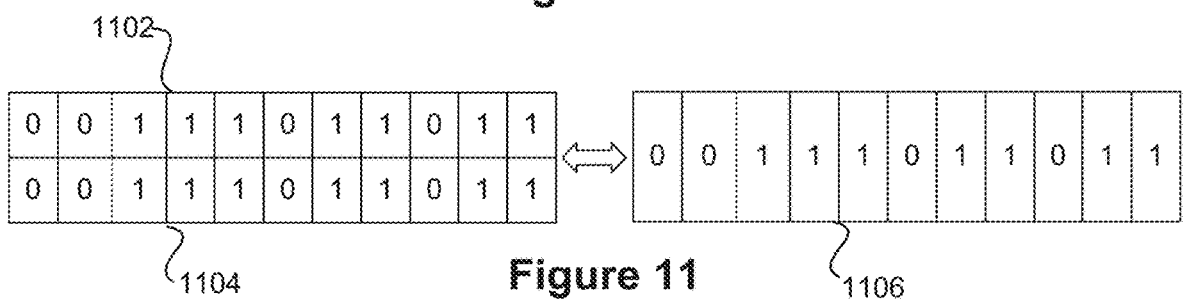
FIG. 11 depicts PSC fillers when merging or splitting in a height (vertical) direction, in accordance with an embodiment of the present disclosure.

FIG. 11 depicts PSC fillers when merging or splitting in the height (vertical) direction, in accordance with an embodiment of the present disclosure. When merging two PSC fillers in the height direction, the bitmaps of the original fillers must have the same bitmaps, and the resultant filler must also have the same bitmaps. Further, when splitting a PSC filler in the height direction, the resultant fillers have the same bitmap. For example, a first PSC filler having a first bitmap 1102 and a second PSC filler having a second bitmap 1104 may be merged to obtain a third PSC filler having a third bitmap 1106. In another example, the third PSC filler having the third bitmap 1106 may be split into two PSC filler having bitmaps equal to the first bitmap 1102 and the second bitmap 1104.

Figure 12:
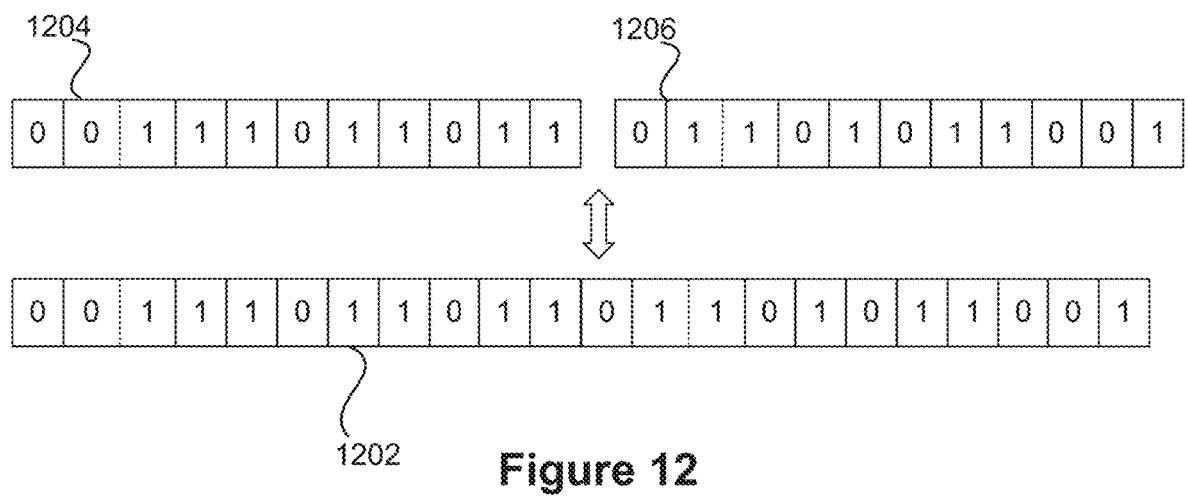
FIG. 12 depicts PSC fillers when merging or splitting in a width (horizontal) direction, in accordance with an embodiment of the present disclosure.

FIG. 12 depicts PSC fillers when merging or splitting in the width (horizontal) direction, in accordance with an embodiment of the present disclosure. When fillers are adjacent in width direction, they can be merged. The bitmap associated with the merged filler is determined by using a string connect operation. For example, a first filler cell and a second filler may be merged to obtain a third filler cell. The bitmap 1202 of the third filler is generated from the bitmap 1204 of the first filler cell and the bitmap 1206 of the second filler cell.

A PSC filler cell whose width is more than one unit width can be split into two or more filler cells. The bitmap for the two or more filler cells can be determined by using a string subtract operation on the bitmap of the PSC filler cell. For example, the bitmap of the two or more filler cells may be determined by applying a subtract operation on bitmap 1202 to obtain bitmap 1204 and bitmap 1206 associated with the two filler cells.

Figure 13:
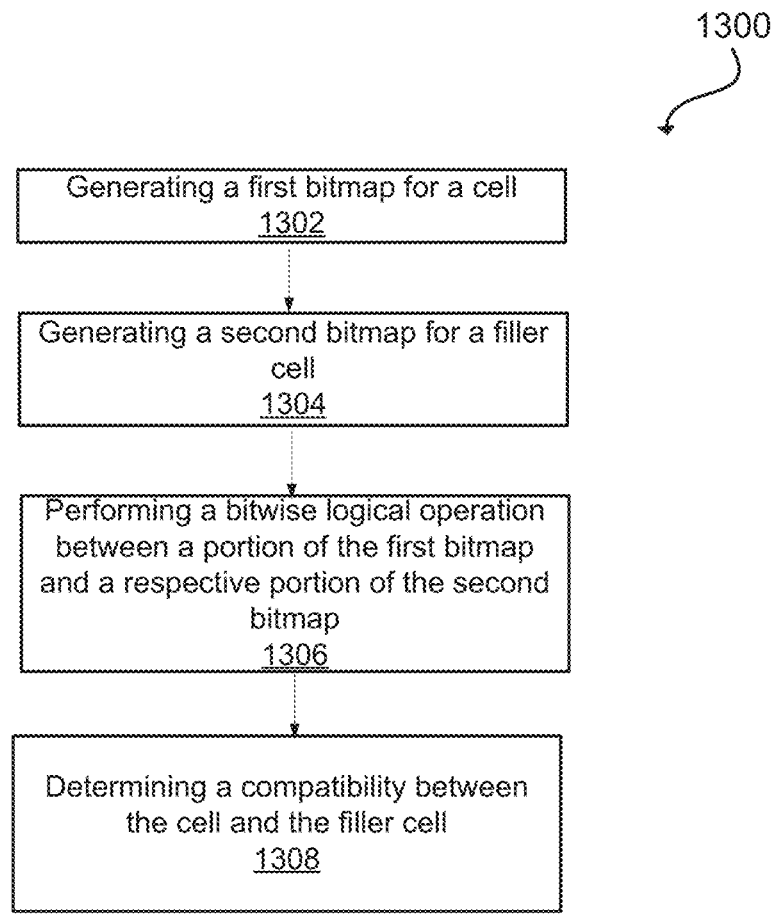
FIG. 13 depicts a flowchart for a process for performing a compatibility check, in accordance with an embodiment of the present disclosure.

FIG. 13 depicts a flowchart for a process for performing a compatibility check, in accordance with an embodiment of the present disclosure.

In 1302, a first bitmap for a cell is generated. The first bitmap is representative of mapping constraints of the cell.

In 1304, a second bitmap for a filler cell is generated. The second bitmap is representative of the mapping constraints of the filler cell.

In 1306, a bitwise logical operation between a portion of the first bitmap and a respective portion of the second bitmap is performed. In one embodiment, the bitwise logical operation is an AND operation.

In 1308, a compatibility between the cell and the filler cell is determined response to a request of a cell-cell filler mapping during an engineering change order flow based on at least a result of the bitwise logical operation.

The bitwise logical operation may be performed to check for the compatibility of the regular standard cells with PG pre-routes. In one embodiment, the first bitmap may be associated with a standard cell. The bitmap of the standard cell may be generated as described above with respect to the PSC cell. The second bitmap may be associated with rows where standard cells are placed, in which each site corresponds to bits indicating the presence or absence of PG pre-route connections on tracks above the standard cell placement site. The second bitmap may indicate rows where the standard cells are placed. The bits of the second bitmap indicates the presence or absence of PG pre-route connections on tracks above the standard cell placement site. In one embodiment, the bitwise logical operation may be an AND operation. The compatibility of a regular standard cell with PG pre-routes is determined based on a least a result of the bitwise logical operation. For example, the standard cells may be compatible when the result of the bitwise logical operation is equal to the first bitmap.

Figure 14:
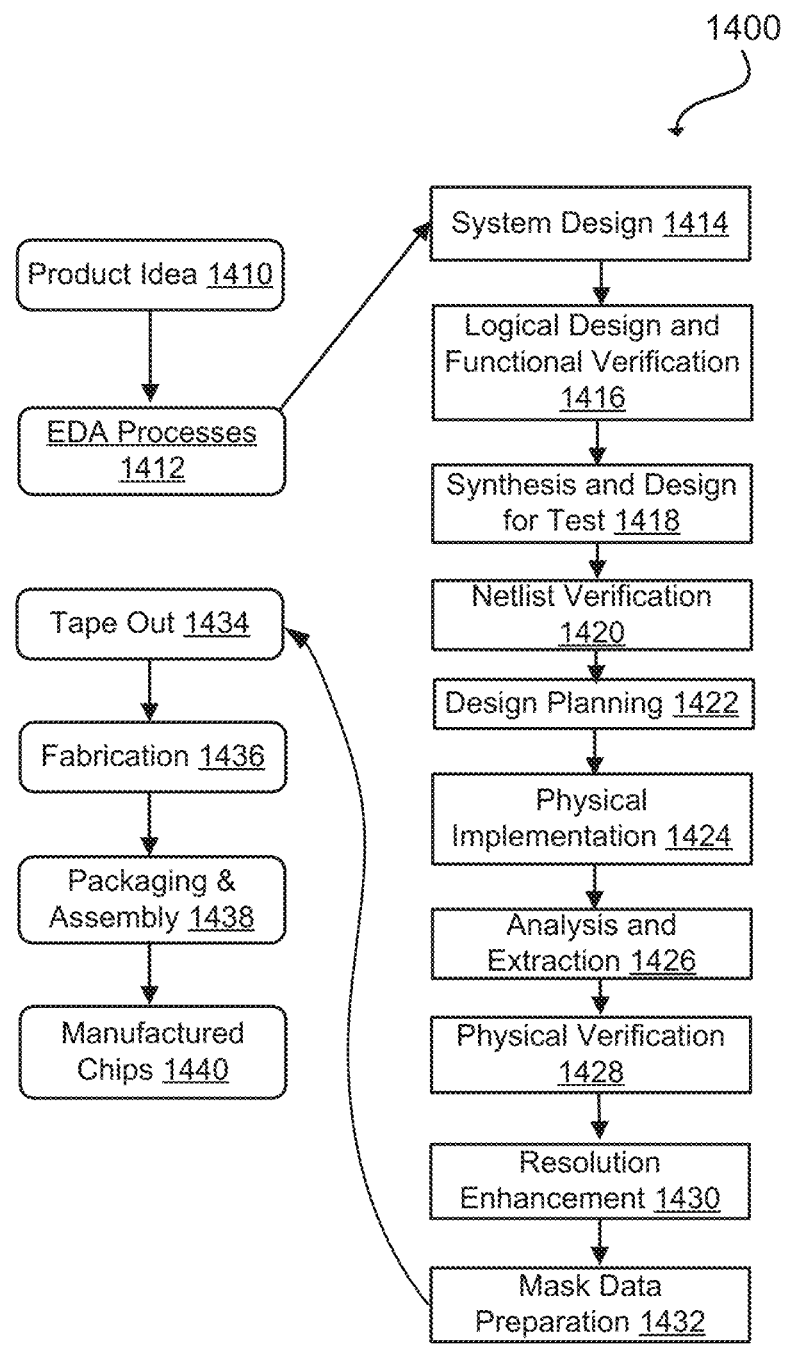
FIG. 14 depicts a flowchart of various processes used during the design and manufacture of an integrated circuit in accordance with some embodiments of the present disclosure.

FIG. 14 illustrates an example set of processes 1400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1410 with information supplied by a designer, information which is transformed to create an article of manufacture that uses a set of EDA processes 1412. When the design is finalized, the design is taped-out 1434, which is when artwork (e.g., geometric patterns) for the integrated circuit is sent to a fabrication facility to manufacture the mask set, which is then used to manufacture the integrated circuit. After tape-out, a semiconductor die is fabricated 1436 and packaging and assembly processes 1438 are performed to produce the finished integrated circuit 1440.

Specifications for a circuit or electronic structure may range from low-level transistor material layouts to high-level description languages. A high-level of abstraction may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 14. The processes described by be enabled by EDA products (or tools).

During system design 1414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1420, the netlist is checked for compliance with timing constraints and for correspondence with the HDL code. During design planning 1422, an overall floor plan for the integrated circuit is constructed and analyzed for timing and top-level routing.

During layout or physical implementation 1424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1426, the circuit function is verified at the layout level, which permits refinement of the layout design. During physical verification 1428, the layout design is checked to ensure that manufacturing constraints are correct, such as DRC constraints, electrical constraints, lithographic constraints, and that circuitry function matches the HDL design specification. During resolution enhancement 1430, the geometry of the layout is transformed to improve how the circuit design is manufactured.

During tape-out, data is created to be used (after lithographic enhancements are applied if appropriate) for production of lithography masks. During mask data preparation 1432, the 'tape-out' data is used to produce lithography masks that are used to produce finished integrated circuits.

A storage subsystem of a computer system (such as computer system 1500 of FIG. 15) may be used to store the programs and data structures that are used by some or all of the EDA products described herein, and products used for development of cells for the library and for physical and logical design that use the library.

Figure 15:
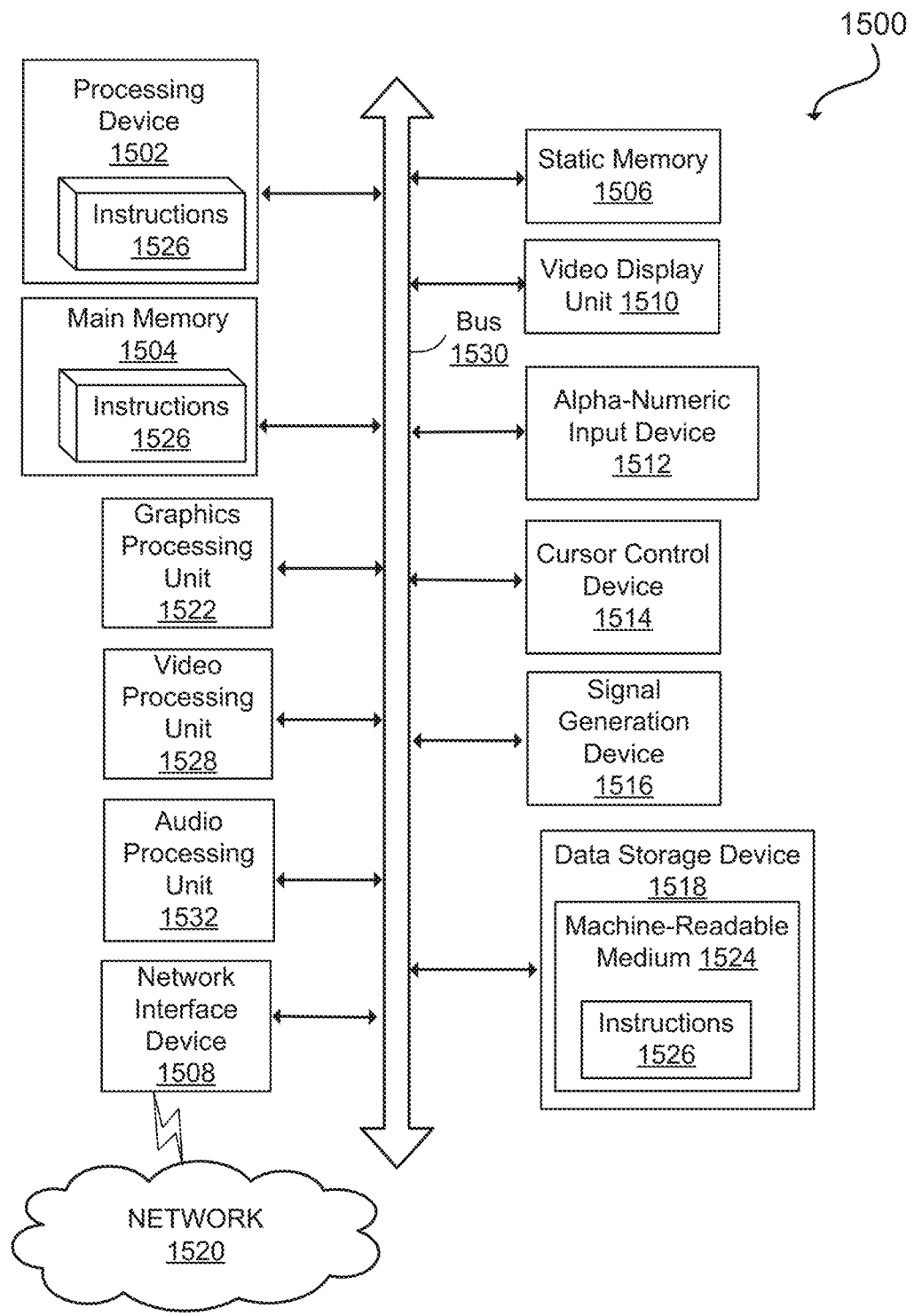
FIG. 15 depicts an abstract diagram of an example computer system in which embodiments of the present disclosure may operate.

FIG. 15 illustrates an example machine of a computer system 1500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1500 includes a processing device 1502, a main memory 1504 (e.g., read-only memory (ROM), flash memory, dynamic random access memory (DRAM) such as synchronous DRAM (SDRAM), a static memory 1506 (e.g., flash memory, static random access memory (SRAM), etc.), and a data storage device 1518, which communicate with each other via a bus 1530.

Processing device 1502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. The processing device 1502 may be configured to execute instructions 1526 for performing the operations and steps described herein.

The computer system 1500 may further include a network interface device 1508 to communicate over the network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a graphics processing unit 1522, a signal generation device 1516 (e.g., a speaker), graphics processing unit 1522, video processing unit 1528, and audio processing unit 1532.

The data storage device 1518 may include a machine-readable storage medium 1524 (also known as a non-transitory computer-readable medium) on which is stored one or more sets of instructions 1526 or software embodying any one or more of the methodologies or functions described herein. The instructions 1526 may also reside, completely or at least partially, within the main memory 1504 and/or within the processing device 1502 during execution thereof by the computer system 1500, the main memory 1504 and the processing device 1502 also constituting machine-readable storage media.

In some implementations, the instructions 1526 include instructions to implement functionality corresponding to the present disclosure. While the machine-readable storage medium 1524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    generating, by one or more processing devices, a first bitmap for a circuit cell, the first bitmap being indicative of mapping constraints of the circuit cell, wherein the mapping constraints of the circuit cell correspond to at least a track location and a mask pattern;

generating, by the one or more processing devices, a second bitmap for a programmable spare cell (PSC) filler cell, the second bitmap being indicative of the mapping constraints of the PSC filler cell, wherein one or more bit values of the second bitmap indicate a presence of a metal shape in a corresponding metal track;

performing, by the one or more processing devices, a bitwise logical operation between a portion of the first bitmap and a respective portion of the second bitmap; and determining, by the one or more processing devices, a metal compatibility between the cell and the PSC filler cell based on at least a result of the bitwise logical operation.

2. The method of claim 1, wherein each of the first bitmap and the second bitmap comprise a binary array and each of the portion of the first bitmap and the respective portion of the second bitmap are indicative of a shape constraint.

3. The method of claim 1, wherein the bitwise logical operation is an AND operation and the cell and the PSC filler cell are metal compatible when the result of the bitwise logical operation is equal to the portion of the first bitmap.

4. The method of claim 1, wherein each of the first bitmap and the second bitmap comprise a binary array and wherein determining a metal compatibility between the cell and the PSC filler cell further includes:

comparing one or more bits of the first bitmap with respective one or more bits of the second bitmap, the one or more bits being indicative of a track alignment constraint and the cell and the PSC filler cell being type compatible when the one or more bits of the first bitmap are equal to the one or more bits of the second bitmap.

5. The method of claim 4, wherein the one or more bits indicative of the track alignment constraint are determined based on a track offset value and a mask pattern type.

6. The method of claim 1, wherein a length of the portion of the first bitmap or the second bitmap corresponds to a number of tracks on a respective cell.

7. The method of claim 1, wherein a length of the portion of the first bitmap or the second bitmap is greater than a number of tracks on a respective cell.

8. The method of claim 1, wherein a binary 1 in the portion of the first bitmap indicates a presence of a metal shape and a binary 0 in the respective portion of the second bitmap for the PSC filler cell indicates the presence of the metal shape.

9. The method of claim 1, wherein generating the first bitmap of the cell includes:

determining a number of bits in the portion of the first bitmap based on a cell width and a track space;

determining track locations within the cell based on metal shapes and the track space; and deriving a bit value for each track location, wherein a binary one is assigned when a metal shape is present.

10. The method of claim 1, wherein a bitmap associated with the PSC filler cell obtained by merging a first filler cell and a second filler cell in a vertical direction is equal to the bitmap of the first filler cell.

11. The method of claim 1, further comprising:

splitting, in a vertical direction, the PSC filler cell into a first filler cell and a second filler cell; and associating the second bitmap with the first filler cell and the second filler cell.

12. The method of claim 1, further comprising:

merging, in a horizontal direction, the PSC filler cell with an adjacent filler cell to obtain a third filler cell; and generating a third bitmap associated with the third filler cell by performing a string connect operation between the second bitmap and a bitmap of the adjacent filler cell.

13. The method of claim 1, wherein the computability is determined in response to a request of a cell-cell filler mapping during an engineering change order flow.

14. A system comprising:

a memory storing instructions; and a processor, coupled with the memory and to execute the instructions, the instructions when executed cause the processor to:

generate a first bitmap for a circuit cell, the first bitmap being indicative of mapping constraints of the circuit cell, wherein the mapping constraints of the circuit cell correspond to at least a track location and a mask pattern, generate a second bitmap for a programmable spare cell (PSC) filler cell, the second bitmap being indicative of the mapping constraints of the PSC filler cell, wherein one or more bit values of the second bitmap indicate a presence of a metal shape in a corresponding metal track, perform a bitwise logical operation between a portion of the first bitmap and a respective portion of the second bitmap, and determine, in response to a request of a cell-cell filler mapping during an engineering change order flow, a metal compatibility between the cell and the PSC filler cell based on at least a result of the bitwise logical operation.

15. The system of claim 14, wherein each of the first bitmap and the second bitmap comprise a binary array and each of the portion of the first bitmap and the respective portion of the second bitmap are indicative of a shape constraint.

16. The system of claim 14, wherein the bitwise logical operation is an AND operation and the cell and the PSC filler cell are metal compatible when the result of the bitwise logical operation is equal to the portion of the first bitmap.

17. The system of claim 14, wherein each of the first bitmap and the second bitmap comprise a binary array and wherein the processor is further configured to perform operations comprising:

compare one or more bits of the first bitmap with respective one or more bits of the second bitmap, the one or more bits being indicative of a track alignment constraint and the cell and the PSC filler cell being type compatible when the one or more bits of the first bitmap are equal to the one or more bits of the second bitmap.

18. The system of claim 17, wherein the one or more bits indicative of the track alignment constraint are determined based on a track offset value and a mask pattern type.

19. The system of claim 14, wherein a binary 1 in the portion of the first bitmap indicates a presence of a metal shape and a binary 0 in the respective portion of the second bitmap for the PSC filler cell indicates the presence of the metal shape.

\* \* \* \* \*